United States Patent
Nyman et al.

(10) Patent No.: US 8,926,924 B2
(45) Date of Patent: Jan. 6, 2015

(54) EXTRACTION PROCESS

(75) Inventors: Bror Nyman, Vanha-Ulvila (FI); Erkki Paatero, Kauniainen (FI); Stig-Erik Hultholm, Pori (FI); Eero Ekman, Pori (FI)

(73) Assignee: Outotec Oyj, Espoo (FI)

( * ) Notice: Subject to any disclaimer, the term of this patent is extended or adjusted under 35 U.S.C. 154(b) by 139 days.

(21) Appl. No.: 13/576,583

(22) PCT Filed: Jan. 27, 2011

(86) PCT No.: PCT/FI2011/050060
§ 371 (c)(1),
(2), (4) Date: Aug. 1, 2012

(87) PCT Pub. No.: WO2011/095679
PCT Pub. Date: Aug. 11, 2011

(65) Prior Publication Data
US 2012/0297929 A1    Nov. 29, 2012

(30) Foreign Application Priority Data
Feb. 2, 2010   (FI) .................................. 20100033

(51) Int. Cl.
*C04B 35/00* (2006.01)
*C01G 43/00* (2006.01)
*C22B 3/38* (2006.01)
*C22B 60/02* (2006.01)

(52) U.S. Cl.
CPC ............ *C01G 43/003* (2013.01); *C22B 3/0047* (2013.01); *C22B 60/026* (2013.01)
USPC ........................................................ 423/10

(58) Field of Classification Search
None
See application file for complete search history.

(56) References Cited

U.S. PATENT DOCUMENTS 2,859,094 A    11/1958   Schmitt et al.
3,214,239 A    10/1965   Hazen et al.
(Continued)

FOREIGN PATENT DOCUMENTS

| CA | 1 157 278 A  | 11/1983 |
| CA | 1 157 278 A1 | 11/1983 |
| GB | 2 108 947 A  | 5/1983  |

OTHER PUBLICATIONS

El-Nadi et al., "Sulphide Precipitation of Iron and its Effect on the Extraction of Uranium from Phosphoric Acid Medium" Journal of Nuclear and Radiochemical Sciences, (2004), vol. 5, No. 1, pp. 11-15.

(Continued)

*Primary Examiner* — Steven Bos
(74) *Attorney, Agent, or Firm* — Buchanan, Ingersoll & Rooney PC

(57) ABSTRACT

A method for the selective recovery of uranium from a sulphate-based acidic aqueous solution of uranium containing iron and other metals by means of solvent extraction, in which the extractant used in the organic extraction solution is bis(2-ethylhexyl) phosphate and a liquid branched trialkyl phosphine oxide is the modifying agent. It is typical of the method that the uranium concentration in the feed solution is less than 50 mg/l and a reducing agent is introduced into the aqueous and/or extraction solution to prevent the permanent oxidation of iron to trivalent. In the method the majority of the extraction solution is circulated in a circuit consisting of the extraction stage and the storage tank and only a small part of the uranium-loaded extraction solution is routed to scrubbing and stripping.

23 Claims, 5 Drawing Sheets

(56) References Cited

U.S. PATENT DOCUMENTS

Figure 1:
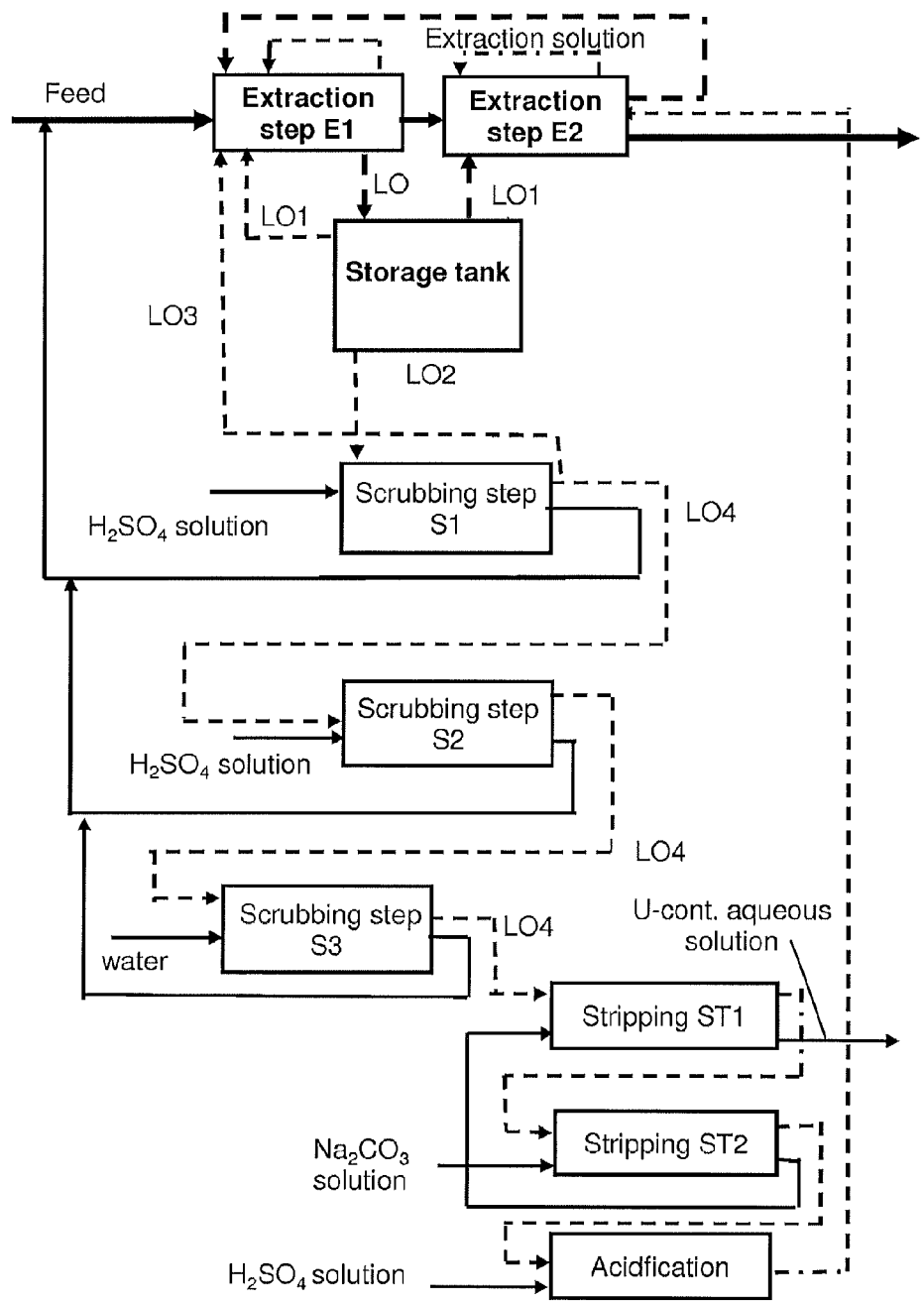

| | | | |
|---|---|---|---|
| 4,002,716 A | | 1/1977 | Sundar |
| 4,432,945 A | | 2/1984 | Hurst et al. |
| 4,816,241 A | | 3/1989 | Bierman et al. |
| 2004/0247504 A1 | * | 12/2004 | Singh et al. ................. 423/8 |

OTHER PUBLICATIONS

Fouad, "Separation of Uranium from its Sulfate Leach Liquor Rich in Iron" Alexandria Engineering Journal, (2001), vol. 40, No. 1, pp. 127-133.

Cyanex® 923 Extactant [tuote-esite]. Julkaistu 2008. [Haettu 4.11.2010] Internetosoitteesta: http://www.cytec.com/specialty-chemicals/PDFs/TransformationalSynthetic/CYANEX%20923.pdf sivu 9, taulukko 7 ja kuva 8. (8 pages).

Ritcey, "Solvent Extraction" vol. 2, Revised 2nd Edition 2006, Ottawa, Canada, Chapter 3—Processes, pp. 505-511, pp. 541-545, pp. 557-565.

Finnish Search Report dated Nov. 5, 2010, issued in corresponding Finnish Patent Application No. 20100033. (1 page).

International Search Report (PCT/ISA/210) issued on May 20, 20122, by the Finnish Patent Office as the International Searching Authority for International Application No. PCT/FI2011/050060.

Written Opinion (PCT/ISA/237) issued on May 20, 2011, by the Finnish Patent Office as the International Searching Authority for International Application No. PCT/FI2011/050060.

Extended Search Report issued in corresponding European Application No. 11739438.7 on Oct. 21, 2014 (8 pages).

* cited by examiner

EXTRACTION PROCESS

FIELD OF THE INVENTION

The invention relates to a method and apparatus for recovering uranium selectively from an aqueous sulphate-based solution, in which the uranium content is low, and in which there are other metals in addition to uranium.

BACKGROUND OF THE INVENTION

The majority of uranium recovery processes target the enrichment of uranium-bearing ore, whereby the uranium concentration of the solution into which it is leached is generally in the region of a few grams per liter. The leach solution is usually sulphate-based, although alkaline leaching has also been used. Due to the growing demand for uranium worldwide, to an increasing extent ores in which uranium is not the main metal but only a secondary product appearing in small concentrations have had to be used as the raw material source. These kinds of raw material sources are in particular solutions occurring in the phosphoric acid, copper and rare earth metal industries as well as the effluents from oil shale mines. The concentrations in these solutions may even be less than 20 ppm. In such cases the grounds for uranium recovery may also be environmental requirements. The recovery of uranium from such a solution is technically and economically more demanding, because the costs of the recovery process must not become too great in relation to the value of the product generated.

Solvent extraction was first adapted for the recovery of uranium on a large scale in the mid-1950s using an extractant including the ingredient bis(2-ethylhexyl) phosphate (CAS No. 298-07-7). This reagent is often referred to in the literature by the name di(2-ethylhexyl) phosphoric acid or by the abbreviation D2EHPA. However, fairly quickly the use of extractants based on tertiary amines became more common. The reason for the popularity of amines was particularly the fact that they were found to have better selectivity with regard to certain impurities such as ferric iron and rare earth metals. Nowadays most new plants use tertiary amines. On the other hand, D2EHPA has numerous other applications e.g. in the hydrometallurgy of zinc, cobalt and nickel. The advantages of D2EHPA over tertiary amines are its significantly lower price, the fact that it is a more powerful extractant and that it is safer for the environment.

In uranium extraction plants known to use the D2EHPA extraction reagent, the recovery of uranium generally occurs with an aqueous solution of sodium or ammonium carbonate. D2EHPA saponifies in stripping and a third liquid phase is formed between the organic solvent and the aqueous phase, which can be prevented with a suitable non-ionic surface-active substance i.e. a modifying agent. Long-chain alcohols among other things have been used in uranium processes, as have alkyl phosphates, alkyl phosphonates and alkyl phosphine oxides. U.S. Pat. No. 2,859,094 describes uranium extraction that takes place from an aqueous solution of sulphuric acid, in which the sulphuric acid concentration is 1.5 M and that of uranium around 1 g/L. As stated in the patent, the modifying agents listed above have a beneficial synergistic effect on the distribution ratio of uranium. One preferred organophosphorus compound mentioned is tributyl phosphine oxide.

A uranium-containing solution often also includes other metals such as iron, aluminium, vanadium, molybdenum, manganese, nickel and rare earth metals. The extraction process must be constructed so that as little of the undesirable substances as possible is extracted along with the uranium.

The article by El-Nadi et al: "Sulphide precipitation of Iron and its Effect on the Extraction of Uranium from Phosphoric Acid Medium", The Japan Society of Nuclear and Radiochemical Sciences, published on the Internet on Jun. 23, 2004, describes phosphoric acid-based leaching in which iron is precipitated from a uranium-bearing aqueous solution by means of sodium sulphide before the solution is routed to extraction. The phosphoric acid concentration of the aqueous solution is 5M, i.e. around 490 g/l. The extractant is D2EHPA and the modifying agent a straight chain trioctyl phosphine oxide, TOPO, which is produced for instance under the commercial trade name CYANEX 921, and has a melting point of 47-52° C. The precipitation of trivalent iron from the aqueous solution has been performed by adding solid sodium sulphide to the solution while simultaneously mixing, so that the iron is precipitated as iron sulphide and, in addition, elemental sulphur is also formed. After this the solution is thickened and filtered to remove the solids and only then is the solution routed to extraction.

Two cases of uranium extraction carried out in Colorado are described on pages 510-511 of the book by Ritcey, G. M.: "Solvent Extraction" vol. 2, Ottawa, Canada, 2006. Climax Uranium has used a process in which uranium is recovered from a solution containing sulphuric acid by extraction, in which the extractant is D2EHPA, the modifying agent tributyl phosphate and the solvent kerosene. Before extraction the iron in the solution is reduced to divalent, so that it is not extracted with the uranium. Uranium was recovered with soda ash, after which the solution was acidified with sulphuric acid and the uranium precipitated by means of ammonia. Cotter Corporation has used a process in which the extractant is also D2EHPA and the modifying agent isodecanol. In the extraction, uranium is separated from cobalt and nickel in four extraction steps. Stripping is performed in three steps by means of sodium carbonate.

PURPOSE OF THE INVENTION

In all the processes described above, there are at least three extraction steps, because particularly in amine-based extraction it is typical that they include several extraction steps. Where uranium recovery from very dilute solutions is concerned, the aim should be to carry out recovery in the most economical way possible i.e. with simple apparatus. The purpose of the invention is to present a method which enables the selective recovery of uranium from a solution that contains only small amounts of uranium, but considerably more iron.

SUMMARY OF THE INVENTION

The essential features of the invention will be made apparent in the appended claims.

The invention relates to a method for the selective recovery of uranium from its acidic aqueous sulphate-based solution containing iron and other metals by means of solvent extraction, in which the organic extraction solution extractant used is bis(2-ethylhexyl) phosphate and a liquid branched trialkyl phosphine oxide is the modifying agent. It is typical of the method that the uranium concentration in the feed solution is less than 50 mg/l and a reducing agent is introduced into the aqueous and/or extraction solution to prevent the permanent oxidation of the iron to trivalent. The extraction stage is carried out in one or two extraction steps and the organic extraction solution exiting the final extraction step, which is loaded with uranium, is routed to a storage tank, where the extraction solution is divided into the first part of the extraction solution and the second part. The first part of the extraction solution is recycled before the scrubbing stage back to the extraction stage to raise the uranium/extractant mole ratio (U/D2EHPA) and the second part of the extraction solution is routed to the scrubbing stage.

It is characteristic of the method that the amount of extractant in the organic extraction solution is 2-7 vol % and the amount of modifying agent is 1-6 vol %.

According to one preferred embodiment of the invention, the reducing agent introduced into the aqueous and/or extraction solution is gaseous hydrogen sulphide. According to another embodiment, the reducing agent introduced into the aqueous and/or extraction solution is gaseous sulphur dioxide.

According to one preferred embodiment, inert gas is routed into the extraction solution. The inert gas is for example nitrogen or carbon dioxide.

According to one preferred embodiment, the extraction steps and the storage tank are equipped with a water trap to prevent oxygen-containing gas getting into the apparatus.

According to one preferred embodiment of the invention, the first part of the extraction solution to be recycled back to extraction together with the internal circulation makes up 70-99% of the total quantity of extraction solution.

It is characteristic of the method accordant with the invention that the second part of the extraction solution exiting the storage tank is routed to the first step of the three-step scrubbing stage, in which it is scrubbed with an aqueous solution with a sulphuric acid concentration of 40-250 g/l, after which the second extraction solution is divided into third and fourth extraction solutions, whereby the third extraction solution, amounting to 70-90% of the second part of the extraction solution routed into the first scrubbing step, is recycled to the extraction stage. The fourth part of the extraction solution is preferably routed to the second scrubbing step, in which scrubbing is performed with an aqueous solution containing sulphuric acid and after the second scrubbing step, the fourth part of the extraction solution is routed to the third scrubbing step.

According to another embodiment of the invention, the second part of the extraction solution exiting the storage tank is routed to the first and second steps of the three-step scrubbing stage; in the first extraction step the second extraction solution is scrubbed with an aqueous solution with a sulphuric acid concentration of 40-250 g/l, and subsequently the second extraction solution is routed to the second scrubbing step; after the second scrubbing step the second extraction solution is divided into third and fourth extraction solutions, whereby the third extraction solution, which amounts to 70-90% of the second part of the extraction solution routed into the first scrubbing step, is recycled to the extraction stage and the fourth extraction solution is fed into the third scrubbing step.

According to one preferred embodiment of the invention, the sulphuric acid concentration of the aqueous solution in the second scrubbing step is 40-250 g/l. According to another embodiment of the invention, the sulphuric acid concentration of the aqueous solution in the second scrubbing step is 250-400 g/l.

It is characteristic of the method accordant with the invention that the residence time of the solution in the first scrubbing step is 5-20 min and in the second scrubbing step residence time is at least three times that for the first scrubbing step.

According to one preferred embodiment of the invention, the aqueous solution in the third scrubbing step is pure water.

In one application of the method, the aqueous solutions of the scrubbing steps are routed after scrubbing to the feed solution entering the extraction stage. In a further application of the method, the amount of aqueous solution routed to the scrubbing steps of the scrubbing stage is 10-20% of the corresponding amount of extraction solution routed to the step.

It is typical of the method accordant with the invention that in the scrubbing steps the aqueous solution is kept continuous and the extraction solution in droplets.

In one application of the method, after the third scrubbing step the fourth extraction solution is routed to stripping, in which uranium is transferred from the extraction solution to an aqueous solution of sodium carbonate, from which it is precipitated.

In another application of the method, after the third scrubbing step the fourth extraction solution is routed to stripping, in which the uranium is transferred from the extraction solution to the aqueous solution of sodium carbonate and routed to a second extraction stage operating in a separate extraction circuit. The number of extraction steps in the second extraction stage is typically 2-3, after which the uranium-depleted aqueous solution is recycled to be combined with the feed solution of the first extraction stage, the extraction solution loaded with uranium is routed to stripping without a scrubbing stage, and the aqueous solution exiting stripping is routed to uranium precipitation.

LIST OF DRAWINGS

Figure 2:
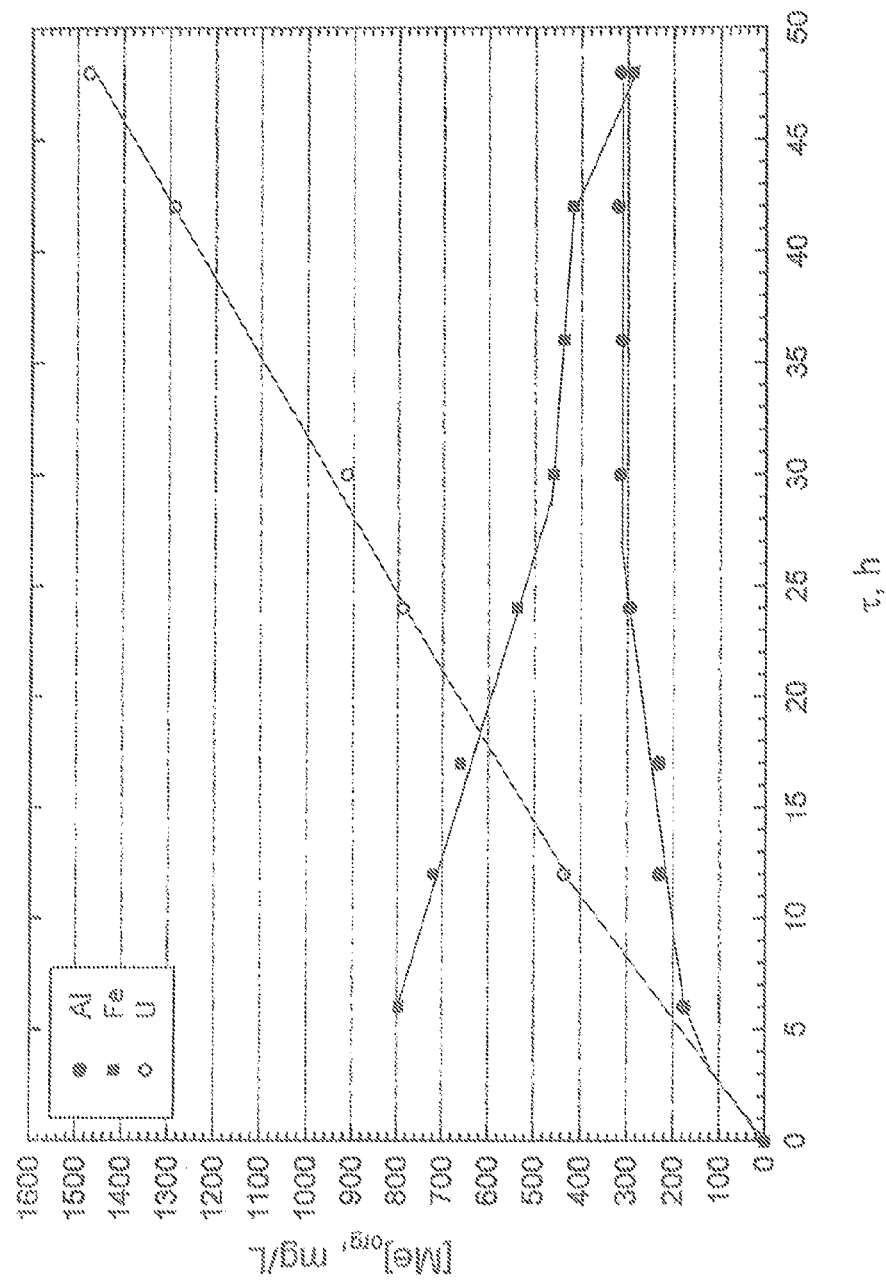
Figure 3:
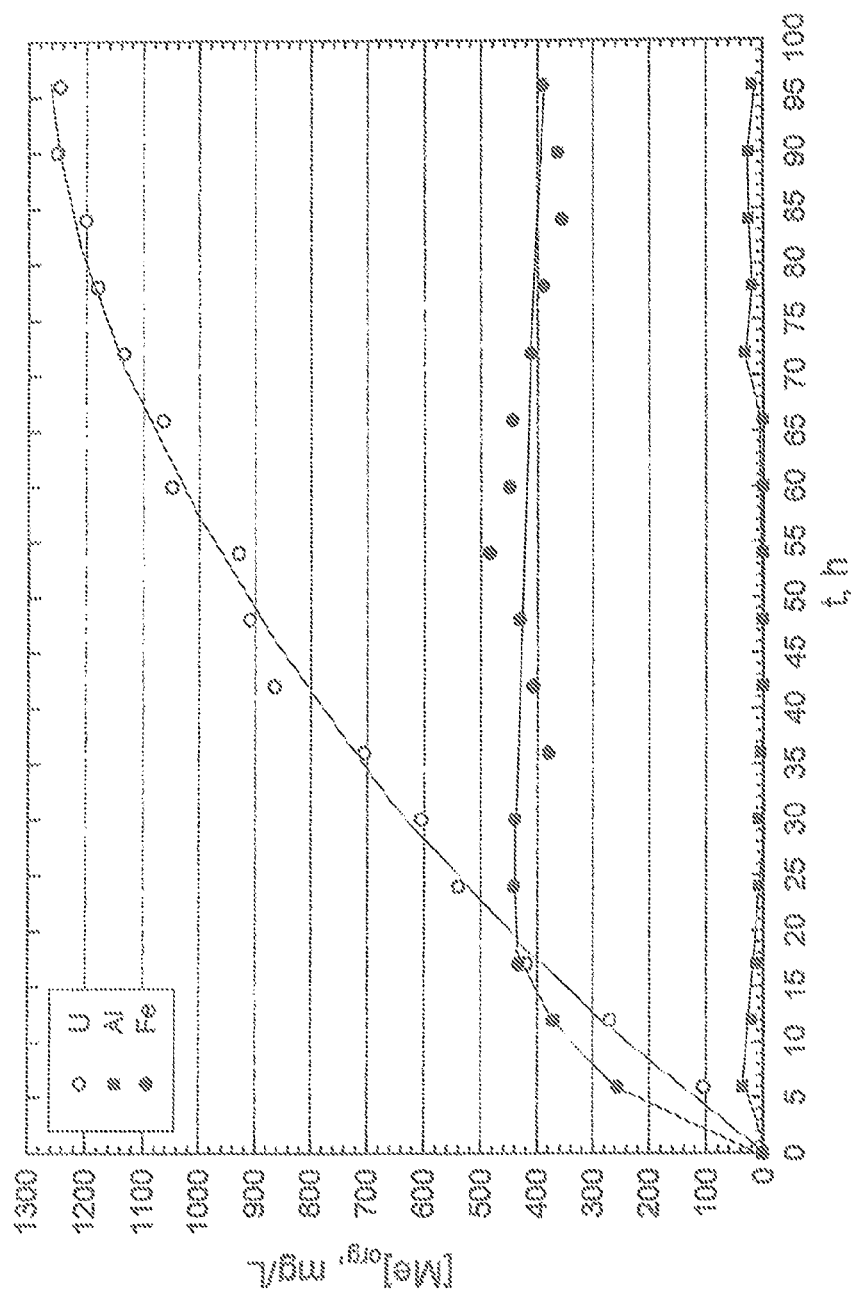
Figure 4:
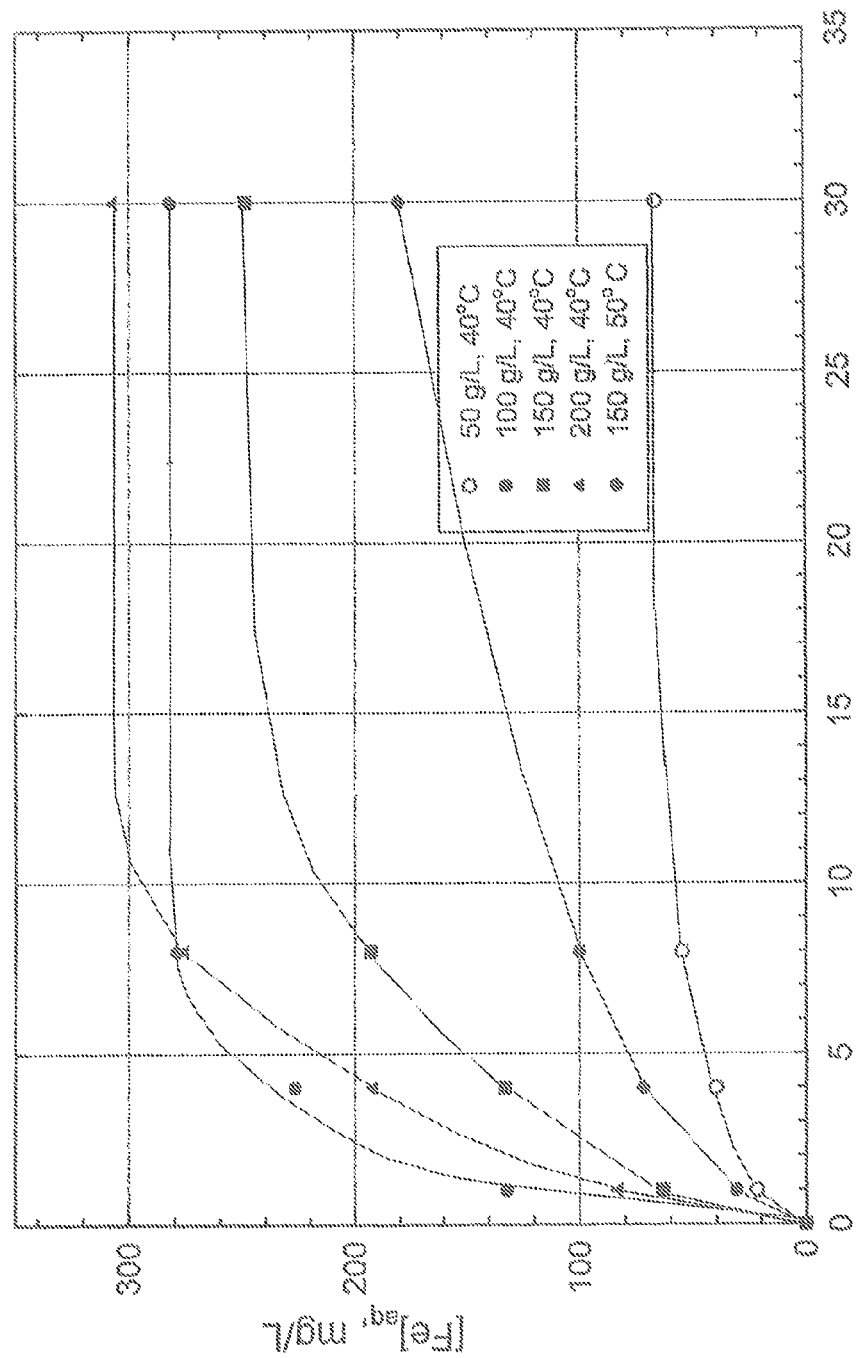
Figure 5:
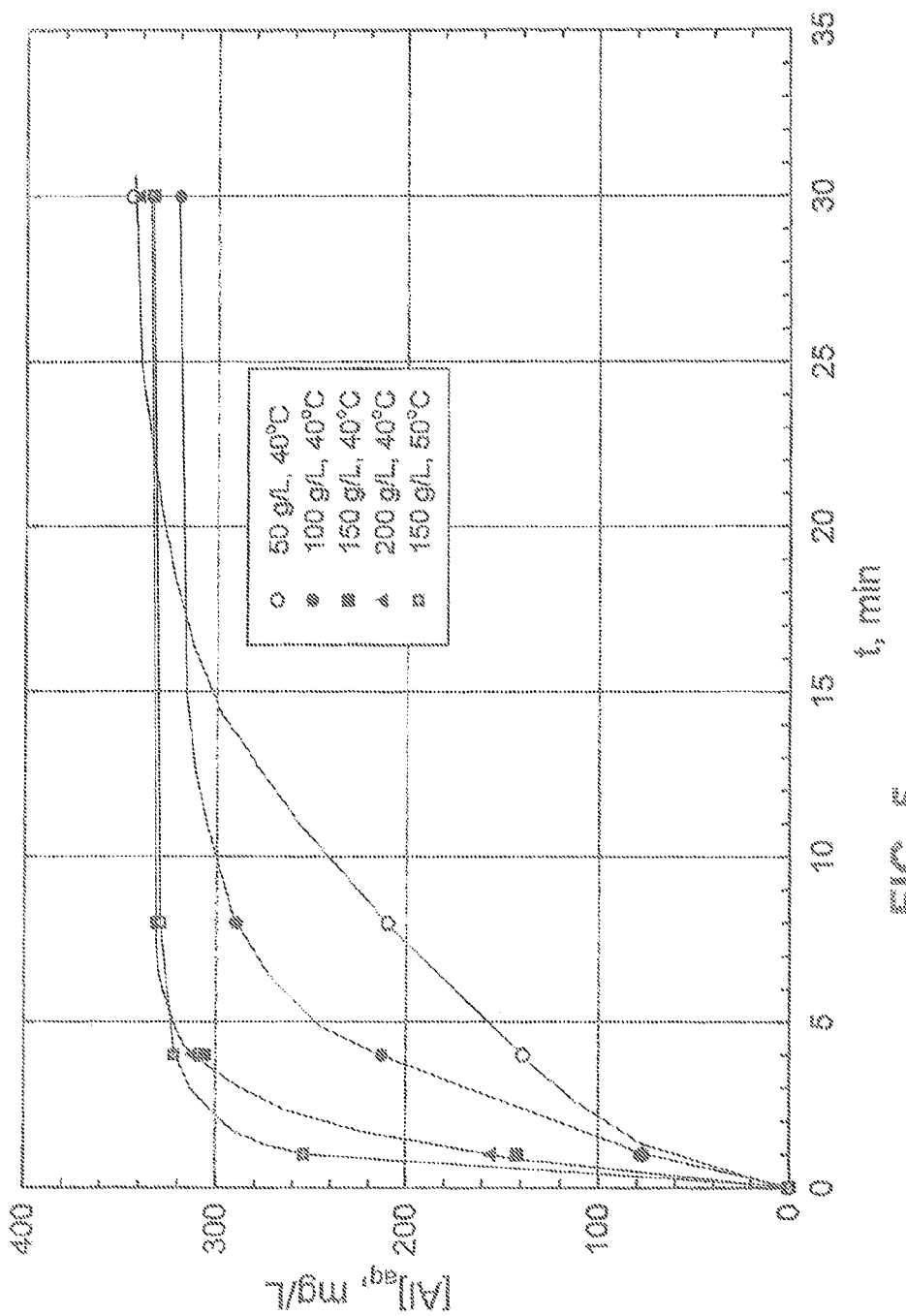

FIG. 1 presents a flow chart of one method accordant with the invention,

FIG. 2 is a graphical presentation of the solvent extraction of uranium, iron and aluminium into an organic extraction solution as a function of time in the case of example 1, FIG. 3 is a graphical presentation of the solvent extraction of uranium, iron and aluminium into an organic extraction solution as a function of time in the case of example 2, FIG. 4 is a graphical presentation of the removal of iron into an aqueous solution in the organic extraction solution scrubbing stage as a function of time, and FIG. 5 is a graphical presentation of the removal of aluminium into an aqueous solution in the organic extraction solution scrubbing stage as a function of time.

DETAILED DESCRIPTION OF THE INVENTION

The invention relates to a method for the selective recovery of uranium by solvent extraction from a sulphate-based aqueous solution containing it, in which the uranium content is low. The method is especially suitable for solutions in which in addition to uranium there are also other metals, such as iron, aluminium, manganese, nickel and copper, in considerably greater amounts than the uranium. A typical low uranium concentration is less than 50 mg/l. The extractant preferably used in the organic extraction solution is bis(2-ethylhexyl) phosphate (D2EHPA), the modifying agent liquid branched trialkyl phosphine oxide and the solvent an aliphatic hydrocarbon solvent, such as kerosene for instance. One commercial trade name of liquid trialkyl phosphine oxide is CYANEX 923. One preferred combination is a 3.5 vol % extractant and 2.2 vol % modifying agent, although the amount of extractant may vary e.g. in the region of 2-7 vol % and the amount of modifying agent in the region of 1-6 vol %. All the other percentages appearing in the text below also refer to volume percentages. It was found in our research that this combination enables a high uranium loading degree in the extraction solution i.e. the molar ratio between the uranium and the extractant U/D2EHPA is set to be greater than 0.06. Likewise a high uranium distribution ratio, i.e. over 1000, is characteristic of the combination.

A dilute aqueous solution containing uranium is usually formed in conjunction with the recovery of some other valuable metal, and concentrates to be leached also contain iron in addition to at least one valuable metal, such as nickel or copper. Another source of dilute solutions is certain effluents, in which the amount of other metals is low. As mentioned above, the extraction of iron along with the uranium can be prevented when operating in conditions in which the iron in aqueous solution is mainly in divalent form or is reduced to divalent before extraction. It is not described in detail in the prior art how reduction is carried out. We have now found that a reducing agent has to be present in the actual extraction process, preventing the permanent oxidation of the iron to trivalent. In some cases there may be a reducing agent in the aqueous solution before extraction, but if there is not, the reducing agent is introduced either into the feed solution for extraction or into the organic solution. One preferred reducing agent is hydrogen sulphide, $H_2S$. Sulphur dioxide, $SO_2$, is also a possible reducing agent. The pH of the aqueous solution entering extraction is preferably around 0.5-2.5, i.e. there is also a little sulphuric acid in the solution. Copper, nickel, magnesium and manganese are not extracted in uranium extraction conditions.

It is advantageous to design extraction so that the aqueous solution can also be a continuous phase especially when the solids content of the feed solution is low, preferably below 50 mg/L. If, in extraction, the uranium-depleted aqueous solution contains other valuable metals, the aqueous solution is routed to recovery of these metals after extraction. In the tests performed it was found that the extraction stage is effective, even if it does not contain more than a single extraction step, because the extraction solution is recycled to raise its uranium content before it is routed to stripping. Transfer of uranium to the organic extraction solution has been found to be over 90% even in a single step. However, the extraction stage accordant with the invention may contain one or two extraction steps.

The method accordant with the invention is also described by means of the appended flow chart 1, in which the extraction stage comprises two steps, E1 and E2. The aqueous solution is depicted by a solid line and the organic solution by a dashed line. It is clear to professionals of the field that if extraction occurs in two steps, then the aqueous (feed) solution is generally fed from the first step to the second and the extraction solution first to the second step and then to the first. Nevertheless, the invention is not restricted only to these feed methods. The extraction step includes a pump contactor, mixers and a settler or settling section. The organic extraction solution is also recycled conventionally as an internal circulation of extraction solution inside the extraction step from the settling section to the mixing section of the same step, which is also shown in the chart. The internal circulation of the extraction solution in the first extraction step E1 is around 40-60% and in the second step E2, 70-90%.

One characteristic of the method accordant with the invention is the fact that the majority of the extraction solution is recycled in a circuit formed by the extraction stage and the storage tank and just a small part of the loaded extraction solution is routed to scrubbing and stripping.

The uranium-loaded organic extraction solution LO exiting extraction is routed to the storage tank. From the storage tank the extraction solution is routed forward in two separate streams. The first part of the extraction solution, LO1, is recycled from the storage tank back to the mixing section of extraction, in the case of the figure to the second extraction step E2, so that the extraction solution is loaded in terms of uranium as a result of being recycled, i.e. its loading degree is raised. The first part of the extraction solution LO1 can also be partially recycled to the first extraction step E1. The first part of the extraction solution is far larger than the second. The recycled amount is 70-99% of the total extraction solution, so it also includes an internal circulation. With this arrangement the loading degree of extraction step E2 can be made smaller than the loading degree of the extraction solution in extraction step E1.

It is advantageous for the method that the extraction solution and the metals dissolved in it are at no stage able to be oxidised and therefore an inert gas is fed into the extraction solution in circulation. The gas may be for example nitrogen, which is bubbled through the extraction solution in the storage tank or at some other suitable point. Another useful inert gas is carbon dioxide, which is formed in stripping. On account of the gas feed, the storage tank and extraction stage apparatus are equipped with a cover and water trap to prevent oxygen-containing gases getting into the equipment and the inert gas exiting the process.

The second part of the extraction solution, LO2, amounting to around 1-30% of the total organic extraction solution, is routed to the scrubbing stage. It is preferable to perform the scrubbing stage in several steps, of which the first two are acidic scrubs. The impurities bound to the organic extraction solution, such as iron, aluminium and vanadium, are scrubbed from it by means of scrubbing with an acidic aqueous solution. The apparatus of each scrubbing step consists of a mixing section and a settling section. The sulphuric acid concentration of the aqueous solution in the first scrubbing step is around 40-250 g/l, whereby the impurities can mostly be scrubbed out of the extraction solution. The tests performed showed that as early as after the first scrubbing step, 93% of the iron was washed out.

It is also typical of the method accordant with the invention that the organic extraction solution exiting the first scrubbing step S1 is further divided into two parts, in other words, the third part of the extraction solution LO3 and the fourth part of the extraction solution LO4. The third part of the extraction solution, LO3, is recycled back to the mixing section of extraction step E1. The fourth extraction solution LO4 is routed to the second scrubbing step S2. The amount of the third extraction solution LO3 is around 70-90% of the second extraction solution routed to scrubbing and around 3-10% of the total amount of extraction solution. As stated above, the third extraction solution LO3 routed back into circulation is fairly pure with regard to iron.

According to one other alternative of the invention (not shown), the second extraction solution LO2 is routed in its entirety to the second scrubbing step S2 and is divided into the third extraction solution LO3 and the fourth extraction solution LO4 only after the second scrubbing step.

The sulphuric acid concentration of the aqueous solution in the second scrubbing step S2 can be kept at the same level as in the first scrubbing step, or it can be higher than the first, so that it lies in the region of 250-400 g/l. It is advantageous, however, that both scrubbing steps are performed at as dilute a sulphuric acid concentration as possible (40-200 g/l), because in this way the loss of extractant as a result of hydrolysis reactions is minimised. It is advantageous to construct apparatus for the first and second scrubbing steps of the same size, so that the residence time of the extraction solution in the second scrubbing step is correspondingly longer, because the amount of extraction solution LO4 entering this step is only 10-30% of the amount entering the first step. Preferably the residence time in the first scrubbing step is 5-20 min and in the second scrubbing step at least three times as much as in the first. The aqueous solution in each scrubbing step is recycled to be combined with the feed solution entering the first extraction step or to some other process stage prior to extraction.

Only the fourth extraction solution LO4 is fed into the third scrubbing step S3. Scrubbing takes place with pure water, so it is largely a physical cleansing of the extraction solution. In particular, it is typical of acidic scrubbing steps that even though the amount of aqueous solution is only around 10-20% of the amount of extraction solution entering the step, nevertheless the mixing conditions of the scrubbing steps are preferably arranged so that the organic extraction solution is in droplets and the aqueous solution is continuous. This arrangement ensures conditions in which the scrubbing of the extraction solution from impurities is effective. After the second scrubbing step S2, 98-99% of the iron in the fourth extraction solution LO4 will have been removed.

The fourth part of the extraction solution part, LO4, which has been purified in the scrubbing steps, is routed to the stripping stage, which is preferably performed in two steps: ST1 and ST2. It is typical of the method that the amount of extraction solution routed to stripping and from there on to the second extraction step E2 is in the region of 0.5-10% of the total amount of extraction solution that is circulating in the extraction steps. In this way a high uranium loading degree is maintained in the extraction solution and the amount of impurities extracted into it remains low. The aqueous solution used in stripping is a sodium carbonate solution, in which the $Na_2CO_3$ concentration is in the region of 100-200 g/l. After stripping, the uranium-depleted extraction solution is alkaline, so that is very reactive to other metals in comparison with uranium. For this reason, the extraction solution is subjected to acidification with a sulphuric acid solution before being routed back to the storage tank, from which it is returned to the extraction circuit.

The aqueous solution bearing sodium carbonate and containing uranium, in which the amount of uranium is generally over a thousand times that of the feed solution routed to extraction, is taken to the uranium precipitation stage. Precipitation takes place in multiple stages by a known method by means of suitable precipitation agents such as sodium hydroxide and hydrogen peroxide, and results in a commercial product that is known as yellowcake.

In some cases it is advantageous to perform a second extraction stage on the uranium-loaded aqueous solution exiting stripping (not shown in detail in the drawing). In this event a separate extraction solution circuit is used and extraction is performed for instance in two or three steps. Since the uranium-bearing aqueous solution exiting stripping as described above is alkaline, it should also be acidified preferably to a pH value of less than 3 before the solution is routed to the second extraction stage. The second extraction stage does not require the kind of scrubbing steps described in connection with the first extraction, because the uranium, which is extracted strongly, prevents other impurities that may still potentially appear in the aqueous solution from being extracted into the organic solution. It is preferable to use the same extractant and modifying agent combination for the extraction solution as in the first extraction stage, with the amount of extractant being around 5-15% and that of the modifying agent 3-10%. Extraction and stripping are performed as countercurrent extraction by a known method. It is advantageous to recycle the uranium-depleted aqueous solution exiting extraction to be combined with the feed solution of the first extraction stage, and the uranium-loaded aqueous solution exiting stripping is routed to uranium precipitation. The purpose of the second extraction stage is to raise the uranium content and purity degree of the aqueous solution further before the uranium is precipitated from it. Obviously the apparatus of the second extraction stage is much smaller than that of the first extraction stage.

EXAMPLES

Example 1

The uranium-bearing feed solution (aqueous solution) had a uranium concentration of 12.4 mg/l, an iron concentration of 14.3 g/l, an aluminium concentration of 1.9 g/l, a nickel concentration of 1.3 g/l and a sulphate concentration of 58 g/l. The solution also contained an amount of sulphuric acid corresponding to a pH value of 1.5, several grams of magnesium and manganese per liter, as well as tens of milligrams of hydrogen sulphide per liter. The extraction solution was a kerosene-based organic solution, in which the amount of extractant (D2EHPA) was 5.0 vol. % and the modifying agent (CYANEX 923) 3.0 vol. %.

The method accordant with the invention was studied in an extraction stage, which consisted of one extraction step. The mixing section of the extraction step comprised two mixers equipped with blade mixers, having a volume of 1 liter. The feed solution and extraction solution were mixed together in the first mixer, and mixing of the dispersion that was formed continued in the second mixer. The dispersion was routed from the second mixer to the settling section of the extraction step for settling. The flow of the feed solution was 18 l/h and the flow of the extraction solution was 12 l/h. The temperature of the solution was adjusted to be 40° C.

In order to demonstrate the characteristics of the invention, uranium was extracted into a restricted amount of extraction solution, 5.0 l, by circulating this amount via the extraction stage for a period of 48 h. Simultaneously, however, fresh feed solution was routed to the extraction stage the whole time so that during the time period 864 l of feed solution flowed through the extraction stage. During the first six hours no shielding gas was fed under the lid of the first mixer but the second mixer and settler were closed and nitrogen was fed into them under the cover. After six hours, nitrogen was also fed under the cover of the first mixer as shielding gas.

Owing to the hydrogen sulphide fed into the feed solution, the iron in the solution was mainly in divalent form, which is not extracted. However, as a result of the oxygen in the air, it was partially oxidised to trivalent, whereupon it was extracted into the extraction solution. The graphical presentation in FIG. 2 shows that during the first six hours of the time period, the iron concentration of the extraction solution had risen to a value of 800 mg/l, which corresponds to about 60% of the extraction capacity of the extraction solution in question. When oxygen was prevented from entering the first mixer also by means of shielding gas and a reducing agent, in this case hydrogen sulphide, was routed to the feed solution, it was observed that these actions enabled the extraction of iron to be stopped, and the amount of iron that had already accumulated to be discharged out of the extraction solution. The iron reduction reaction also requires the addition of sulphuric acid to the solution:

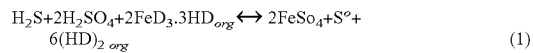
(1)

In the formula D represents the dissociated extractant D2EHPA, HD the reagent in acidic form, and $(HD)_2$ represents the D2EHPA reagent dimer.

FIG. 2 also shows that the combination of extractant and modifying agent works successfully, since the uranium content of the extraction solution rises throughout the entire test period, even though the extractant concentration in the extraction solution is low. In the reaction of the modifying agent sulphuric acid is generated in the solution, which according to formula 1, is also needed to prevent the permanent extraction of iron as stated above. As further shown in FIG. 2, the extraction of aluminium also remains at a low level. It can be stated that an arrangement accordant with the invention enables the selective extraction of uranium from a solution that also contains other metals.

Example 2

The configuration of the equipment in this example was the same kind as in example 1, as were the metal concentrations of the feed solution. The D2EHPA concentration of the extraction solution was lower than in example 1, at 2.0 vol. % and the modifying agent concentration was 1.3 vol. %. The duration of the testing period was 96 h.

FIG. 3 shows a graphical presentation of the extraction of uranium, iron and aluminium into an extraction solution. The uranium content in the extraction solution rises evenly throughout the testing period, but after six hours the iron concentration remains in the region of 400 mg/l and the aluminium concentration around 40 mg/l. In this testing period too, the use of a shielding gas and a feed solution containing hydrogen sulphide cause the permanent extraction of iron to stop and even decrease as the uranium loading degree rises above the uranium/D2EHPA mole ratio of 0.06.

Example 3

The example describes the scrubbing of iron and aluminium from a uranium-bearing extraction solution. The extraction solution used is a uranium-rich solution formed in accordance with example 1.

The diagrams in FIG. 4 describe the removal of iron in acidic scrubbing from an extraction solution into an aqueous solution as a function of time and the diagrams in FIG. 5 describe the removal of aluminium from an extraction solution as a function of time. In each figure the scrubbing of iron or aluminium is presented for scrubbing solutions with different acid concentrations. The sulphuric acid concentration in the aqueous solution in the tests was 50, 100, 150 or 200 g/l when the temperature is 40° C., and 150 g/l at 50° C.

The diagrams in FIGS. 4 and 5 show that both the iron and the aluminium can be well scrubbed from an organic extraction solution by means of an aqueous solution containing sulphuric acid. Therefore in accordance with our invention we can activate the extraction solution, i.e. remove the iron extracted into it and route it partially back to the extraction stage and partially to stripping, where the uranium in the extraction solution is transferred into a second aqueous solution to be recovered further. The uranium-depleted extraction solution is routed back to the extraction stage.

The invention claimed is:

1. A method for the selective recovery of uranium from a sulphate-based acidic aqueous solution of uranium containing iron and other metals by means of solvent extraction, in which the extractant used in anthe organic extraction solution is bis(2-ethylhexyl) phosphate and a liquid branched trialkyl phosphine oxide modifying agent, wherein the uranium concentration in a feed solution is less than 50 mg/l and a reducing agent is introduced into the aqueous solution and/or extraction solution to prevent the permanent oxidation of iron to trivalent; an extraction stage is performed in a single extraction step or two extraction steps and uranium-loaded organic extraction solution exiting a final extraction step is routed to a storage tank, in which the uranium-loaded organic extraction solution is divided into a first part of the extraction solution and a second part of the extraction solution; the first part of the extraction solution is recycled before a scrubbing stage back to the extraction stage to raise the uranium/extractant ratio and the second part of the extraction solution is routed to the scrubbing stage.

2. A method according to claim 1, wherein the amount of extractant in the organic extraction solution is 2-7 vol. % and the amount of modifying agent 1-6 vol. %.

3. A method according to claim 1, wherein the reducing agent introduced into the aqueous and/or extraction solution is gaseous hydrogen sulphide.

4. A method according to claim 1, wherein the reducing agent introduced into the aqueous and/or extraction solution is gaseous sulphur dioxide.

5. A method according to claim 1, wherein an inert gas is routed into the extraction solution.

6. A method according to claim 1, wherein the inert gas is nitrogen.

7. A method according to claim 1, wherein the inert gas is carbon dioxide.

8. A method according to claim 1, wherein the storage tank and an extraction stage apparatus are equipped with a cover and a water lock to prevent oxygen-containing gas from entering the storage tank or the apparatus.

9. A method according to claim 1, wherein the first part of the extraction solution recycled from the storage tank back to extraction together with internal circulation comprises 70-99% of the total amount of extraction solution.

10. A method according to claim 1, wherein the second part of the extraction solution is routed to a first scrubbing step of a three-step scrubbing stage, in which it is scrubbed with aqueous solution having a sulphuric acid concentration of 40-250 g/l, after which the second part of the extraction solution is divided into a third extraction solution and a fourth extraction solution, whereby the third extraction solution, amounting to 70-90% of the second part of the extraction solution routed to the first scrubbing step, is recycled to the extraction stage.

11. A method according to claim 10, wherein the fourth extraction solution is routed to the second scrubbing step, in which scrubbing is performed with an aqueous solution of sulphuric acid and after the second scrubbing step, the fourth extraction solution is routed to the third scrubbing step.

12. A method according to claim 1, wherein the second part of the extraction solution exiting the storage tank is routed to the first and second steps of a three-step scrubbing stage; in the first extraction step the second part of the extraction solution is scrubbed with an aqueous solution, having a sulphuric acid concentration of 40-250 g/l and subsequently the second part of the extraction solution is routed to the second scrubbing step; after the second scrubbing step the second part of the extraction solution is divided into third and fourth extraction solutions, whereby the third extraction solution, amounting to 70-90% of the second part of the extraction solution routed to the first scrubbing step, is recycled to the extraction stage and the fourth extraction solution is fed to the third scrubbing step.

13. A method according to claim 10, wherein the sulphuric acid concentration of the aqueous solution in the second scrubbing step is 40-250 g/l.

14. A method according to claim 10, wherein the sulphuric acid concentration of the aqueous solution in the second scrubbing step is 250-400 g/l.

15. A method according to claim 10, wherein the residence time of the solutions in the first scrubbing step is 5-20 min and the residence time in the second scrubbing step is at least three times that of the first scrubbing step.

16. A method according to claim 10, wherein aqueous solution of the third scrubbing step is pure water.

17. A method according to claim 10, wherein the aqueous solutions of the scrubbing steps are routed after scrubbing to the feed solution entering the extraction stage.

18. A method according to claim 10, wherein the amount of aqueous solution routed to the scrubbing steps of the scrubbing stage is 10-20% of the amount of extraction solution routed to the corresponding scrubbing step.

19. A method according to claim 10, wherein the aqueous solution is kept as a continuous phase and the extraction solution is kept as droplets in the scrubbing steps.

20. A method according to claim 10, wherein after the third scrubbing step the fourth extraction solution is routed to stripping, in which uranium is transferred from the extraction solution to an aqueous solution of sodium carbonate, from which the uranium is precipitated.

21. A method according to claim 10, wherein after the third scrubbing step the fourth extraction solution is routed to stripping, in which uranium is transferred from the extraction solution to an aqueous solution of sodium carbonate and is routed to a second extraction stage operating in a separate extraction circuit.

22. A method according to claim 21, wherein the number of extraction steps in the second extraction stage is 2-3, after which the uranium-depleted aqueous solution is recycled to be combined with the feed solution for the first extraction stage, the uranium-loaded extraction solution is routed to stripping without a scrubbing stage and the aqueous solution from stripping is routed to uranium precipitation.

23. A method according to claim 1, wherein the mole ratio of uranium and extractant U/D2EHPA is greater than 0.06.

* * * * *